US007668253B2

(12) United States Patent
Hwang et al.

(10) Patent No.: US 7,668,253 B2
(45) Date of Patent: Feb. 23, 2010

(54) METHOD FOR ALLOCATING A SUBCHANNEL IN AN ORTHOGONAL FREQUENCY DIVISION MULTIPLE ACCESS CELLULAR COMMUNICATION SYSTEM

(75) Inventors: In-Seok Hwang, Seoul (KR); Jae-Ho Jeon, Seongnam-si (KR); Soon-Young Yoon, Seoul (KR); Sang-Hoon Sung, Suwon-si (KR); Seung-Joo Maeng, Seongnam-si (KR); Hoon Huh, Seongnam-si (KR); Jae-Hee Cho, Seoul (KR); Jeong-Heon Kim, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 932 days.

(21) Appl. No.: 11/074,040

(22) Filed: Mar. 7, 2005

(65) Prior Publication Data

US 2005/0195909 A1   Sep. 8, 2005

(30) Foreign Application Priority Data

Mar. 5, 2004   (KR) ............................ 2004-15224

(51) Int. Cl.
*H04L 27/00* (2006.01)
*H04B 1/38* (2006.01)
*H04L 23/00* (2006.01)
*H04B 7/208* (2006.01)

(52) U.S. Cl. .................. 375/295; 375/299; 375/222; 375/377; 370/344

(58) Field of Classification Search ............. 375/135, 375/146, 260, 295, 347, 222, 267, 299, 349, 375/358, 377; 370/206, 310, 329, 431, 465, 370/57, 69.1, 120, 281, 295, 302, 330, 335, 370/336, 341–343, 344, 345, 347, 436, 441–442, 370/478, 480–482; 455/45, 17, 59, 101, 455/104, 450–453
See application file for complete search history.

(56) References Cited

U.S. PATENT DOCUMENTS 6,298,092 B1 * 10/2001 Heath et al. ................ 375/267

(Continued)

FOREIGN PATENT DOCUMENTS

JP   2001-238269   8/2001

(Continued)

OTHER PUBLICATIONS

Lei et al., An Integrated Subchannel Scheduling Algorithm For Adaptive Modulation and Coding (AMC) MIMO-OFDM Wireless Systems, Aug. 29-Sep. 1, Communications, 2004 and the 5th International Symposium on Multi-Dimensional Mobile Communications Proceedings, The 2004 Joint Conference of the 10th Asian-Pacific Confernece on, vol. 1, pp. 90-94.*

(Continued)

*Primary Examiner*—Tesfaldet Bocure
*Assistant Examiner*—Lawrence B Williams
(74) *Attorney, Agent, or Firm*—The Farrell Law Firm, LLP

(57) ABSTRACT

A method for allocating a subchannel in a transmitter of an Orthogonal Frequency Division Multiple Access (OFDMA) cellular communication system in which an entire frequency band includes a plurality of bands, each of the bands includes a plurality of bins, and each of the bins includes a plurality of subcarriers. The method includes dividing a predetermined time interval into an Adaptive Modulation and Coding (AMC) subchannel time interval and a diversity subchannel time interval; selecting any one of the plurality of bands in the AMC subchannel time interval; selecting a predetermined number of bins among the plurality of bins in the selected band; and allocating the selected bins to the AMC subchannel.

13 Claims, 6 Drawing Sheets

U.S. PATENT DOCUMENTS

| | | | |
|---|---|---|---|
| 6,430,148 | B1 | 8/2002 | Ring |
| 6,545,997 | B1 | 4/2003 | Bohnke et al. |
| 7,103,325 | B1 * | 9/2006 | Jia et al. .................... 455/101 |
| 7,372,836 | B2 * | 5/2008 | Hwang et al. ............... 370/335 |
| 2002/0147017 | A1 | 10/2002 | Li et al. |
| 2003/0112744 | A1 * | 6/2003 | Baum et al. ................. 370/206 |
| 2003/0169824 | A1 * | 9/2003 | Chayat ....................... 375/260 |
| 2003/0174643 | A1 | 9/2003 | Ro et al. |
| 2004/0001429 | A1 * | 1/2004 | Ma et al. .................... 370/210 |
| 2004/0125743 | A1 * | 7/2004 | Hashem et al. ............. 370/208 |
| 2004/0125772 | A9 * | 7/2004 | Wu et al. .................... 370/335 |
| 2005/0025040 | A1 * | 2/2005 | Tang et al. .................. 370/208 |
| 2005/0157639 | A1 | 7/2005 | Song et al. |
| 2005/0157670 | A1 * | 7/2005 | Tang et al. .................. 370/320 |
| 2007/0053456 | A1 * | 3/2007 | Kim ........................... 375/260 |
| 2007/0070944 | A1 * | 3/2007 | Rinne et al. ................. 370/329 |

FOREIGN PATENT DOCUMENTS

| | | |
|---|---|---|
| JP | 2004-056552 | 2/2004 |
| JP | 2005-151583 | 6/2005 |
| JP | 2005-520432 | 7/2005 |
| JP | 2006-504324 | 2/2006 |
| RU | 2 218 459 | 7/2002 |
| RU | 2 216 873 | 11/2003 |
| WO | WO 98/58496 | 12/1998 |
| WO | WO 2004/038972 | 5/2004 |

OTHER PUBLICATIONS

Lomnitz et al, Correction For Definitions of AMC Subchannels, IEEE 802.16 Broadband Wireless Access Working Group, Nov. 17, 2004, pp. 1-6.*

Russian Office Action, Issued on Oct. 9, 2007.

* cited by examiner

METHOD FOR ALLOCATING A SUBCHANNEL IN AN ORTHOGONAL FREQUENCY DIVISION MULTIPLE ACCESS CELLULAR COMMUNICATION SYSTEM

PRIORITY

This application claims priority under 35 U.S.C. § 119 to an application entitled "Method for Allocating Subchannel in an Orthogonal Frequency Division Multiple Access Cellular Communication System" filed in the Korean Intellectual Property Office on Mar. 5, 2004 and assigned Ser. No. 2004-15224, the contents of which are incorporated herein by reference.

BACKGROUND OF THE INVENTION

1. Field of the Invention

The present invention relates generally to a cellular communication system using an Orthogonal Frequency Division Multiple Access (OFDMA) scheme (OFDMA cellular communication system), and in particular, to a method for allocating subchannels in the OFDMA cellular communication system.

2. Description of the Related Art

The next generation mobile communication system requires high-speed, high-quality data transmission in order to support various multimedia services with improved quality. Recently, a large amount of research is being performed on the OFDMA scheme, which is one of the conventional schemes satisfying the foregoing requirement.

Multiple Access schemes based on an Orthogonal Frequency Division Multiplexing (OFDM) scheme can generally be classified into two schemes. A first scheme is an OFDMA scheme in which a plurality of subchannels in one OFDM symbol are shared by a plurality users in a Broadband Wireless Access (BWA) communication system. A communication system proposed by applying the OFDMA scheme to a Fixed and Mobile Broadband Wireless Access (FBWA) communication system is an Institute of Electrical and Electronics Engineers (IEEE) 802.16d/e communication system. In the IEEE 802.16d/e communication system, 2048-point Fast Fourier Transform (FFT) is used and 1702 tones are divided into 166 pilot tones and 1536 data tones. Here, the term "tone" is identical in concept to the subcarrier, and in the following description, it should be noted that the tone has a mixed concept of the tone concept and the subcarrier concept. Further, in the IEEE 802.16d/e communication system, 1536 data tones are grouped into 32 subchannels, each having 48 data tones, and the 32 subchannels are uniquely allocated to respective users.

A second scheme is a Frequency Hopping-OFDM (FH-OFDM) scheme, which is a combination of a Frequency Hopping (FH) scheme and the OFDM scheme. Both the OFDMA scheme and the FH-OFDM scheme are intended for acquiring frequency diversity gain by uniformly dispersing data tones over the entire frequency band. However, the technologies related to the OFDMA scheme and the FH-OFDM scheme, disclosed up to now, never consider separate frequency selective adaptive modulation, except the frequency diversity. Also, an IEEE 802.16e standard never takes the frequency selective adaptive modulation into consideration.

SUMMARY OF THE INVENTION

It is, therefore, an object of the present invention to provide a method for allocating Adaptive Modulation and Coding (AMC) subchannels and diversity subchannels in an OFDMA cellular communication system.

It is another object of the present invention to provide a method for adaptively forming diversity subchannels and AMC subchannels in a variable ratio on a per-OFDM symbol basis for both an uplink and a downlink in an OFDMA cellular communication system.

It is further another object of the present invention to provide a subchannel allocation method capable of supporting various frequency reuse factors in an OFDMA cellular communication system.

It is still another object of the present invention to provide a subchannel allocation method for forming downlink diversity subchannels using a Reed-Solomon (RS) sequence in an OFDMA cellular communication system.

In accordance with an aspect of the present invention, there is provided a method for allocating a subchannel in a transmitter of an Orthogonal Frequency Division Multiple Access (OFDMA) cellular communication system in which an entire frequency band includes a plurality of bands, each of the bands includes a plurality of bins, and each of the bins includes a plurality of subcarriers. The method comprises the steps of dividing a predetermined time interval into an Adaptive Modulation and Coding (AMC) subchannel time interval and a diversity subchannel time interval; selecting any one of a plurality of bands in the AMC subchannel time interval; selecting a predetermined number of bins among the plurality of bins in the selected band; and allocating the selected bins to the AMC subchannel.

In accordance with another aspect of the present invention, there is provided a method for allocating a subchannel in a transmitter of an Orthogonal Frequency Division Multiple Access (OFDMA) cellular communication system in which an entire frequency band includes a plurality of bands, each of the plurality of bands includes a plurality of bins, and each of the plurality of bins includes a plurality of subcarriers. The method comprises the steps of dividing a predetermined time interval into an Adaptive Modulation and Coding (AMC) subchannel time interval and a diversity subchannel time interval; allocating an AMC subchannel in the AMC subchannel time interval; and allocating a diversity subchannel in the diversity subchannel time interval.

In accordance with another aspect of the present invention, there is provided a subchannel for use in a subscriber station by a base station in an Orthogonal Frequency Division Multiple Access (OFDMA) cellular communication system using a frame that includes a plurality of bins arranged in a matrix form of rows and columns, each of the columns represents a time domain, each of the rows represent a frequency domain, each of the rows has a plurality of consecutive subcarriers, the columns represent symbols, and each of the bins include predetermined subcarriers. The subchannel comprises m subcarriers selected from the predetermined subcarriers and having a plurality of sets of bins being spaced part from each other in the same row among the plurality of bins arranged in the matrix form to transmit data to each subscriber station through each subcarrier, wherein the subchannel is allocated such that the subchannel has a plurality of sets of bins neighboring each other in the same row among the plurality of bins.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

The present invention proposes a method for allocating subchannels, i.e., Adaptive Modulation and Coding (AMC) subchannels and diversity subchannels, in a cellular communication system using an Orthogonal Frequency Division Multiple Access (OFDMA) scheme ("OFDMA cellular communication system). In the OFDMA cellular communication system in which the subchannel allocation method proposed in the present invention is applied to a Time Division Duplexing (TDD) scheme, a downlink (DL) and an uplink (UL) are distinguished by time, and a transmission transition gap (TTG), i.e., a guard time for defining a cell boundary, exists in an interval transitioning from the downlink to the uplink. Further, a reception transition gap (RTG), i.e., a guard time for switching, exists in an interval transitioning from the uplink to the downlink. The OFDMA cellular communication system to which the TDD scheme is applied can adjust the time allocated to the downlink and the uplink by the least common multiple (LCM) of a symbol interval forming uplink/downlink subchannels according to the amount of uplink/downlink traffics.

However, in a system in which the subchannel allocation method proposed in the present invention can be applied to a Frequency Division Duplexing (FDD) scheme, a time allocated to the downlink is identical to a time allocated to the uplink, such that the guard times, e.g., the TTG and the TRG, are not required.

Figure 1:
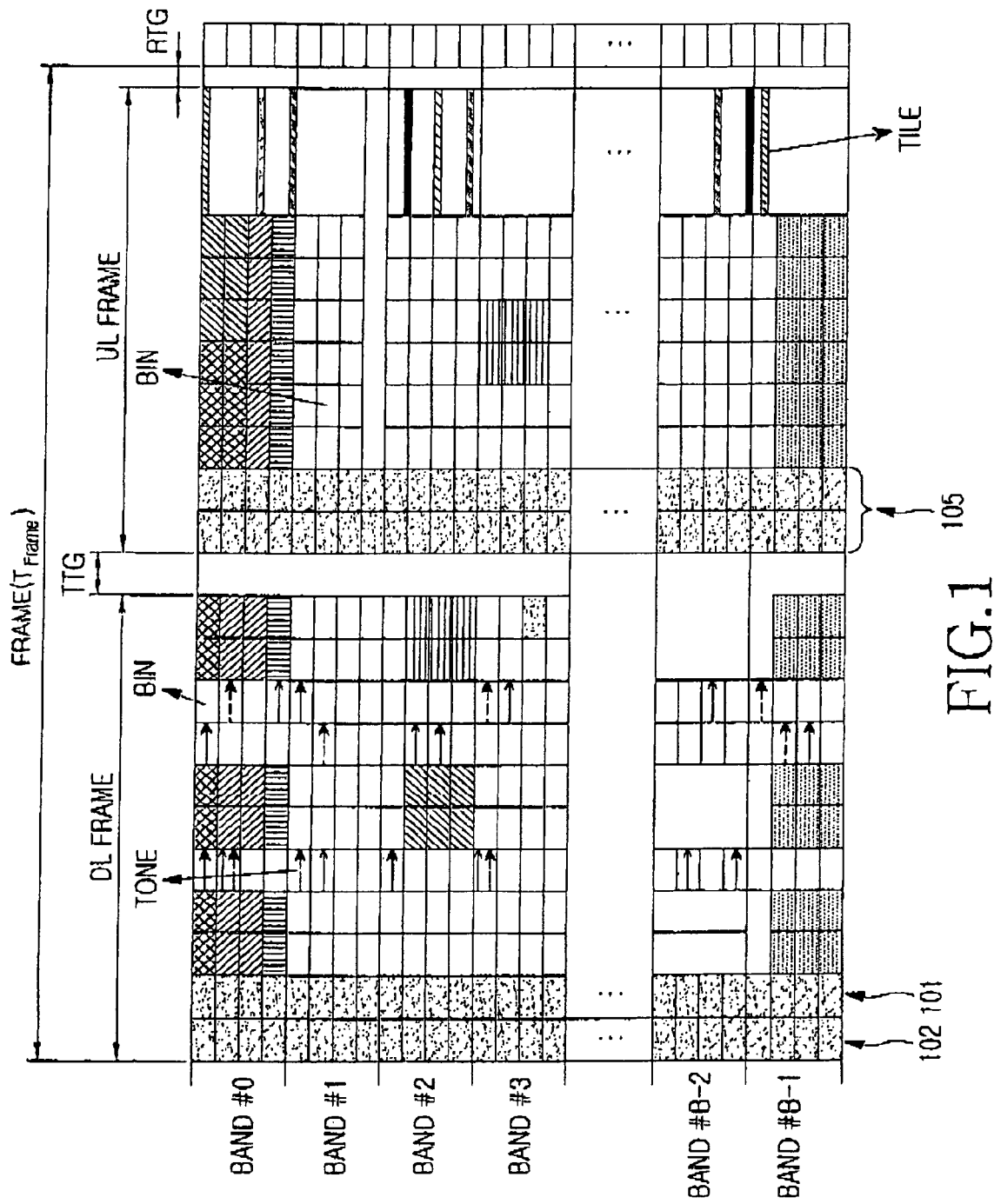
FIG. 1 is a diagram illustrating a frame structure applied to an OFDMA cellular communication system according to an embodiment of the present invention.

FIG. 1 is a diagram illustrating a frame structure applied to an OFDMA cellular communication system according to an embodiment of the present invention. Referring to FIG. 1, the entire frequency band of the OFDMA cellular communication system is divided into B bands, i.e., a band #0 to a band #(B−1), taking AMC subchannels into account. A frame has a period of $T_{frame}$, and the frame includes a downlink frame and an uplink frame.

The downlink frame includes a preamble interval 102 for which preamble signals for base station (BS) identification, synchronization acquisition and channel estimation are transmitted, and a control symbol interval 101 in which system information (SI) is transmitted. The control symbol interval 101 occupies a time interval predetermined in the OFDMA cellular communication system and serves as a diversity subchannel, such that a subscriber station (SS) can demodulate a subchannel including frame structure information. Here, the preamble interval 102 and the control symbol interval 101, as illustrated in FIG. 1, are located in the head of the downlink frame so that the SS can rapidly recognize the conditions of the OFDMA cellular communication system.

The uplink frame includes an interval 105 in which an initial access signal and an uplink control signal of the SS are transmitted. As illustrated in FIG. 1, the interval 105 for transmitting the initial access signal and the uplink control signal is located in the head of the uplink frame so that the OFDMA cellular communication system can quickly recognize the conditions of the SS. In addition, the uplink frame separately defines an interval for an initial access of an SS so that a signal from an SS, which has failed to acquire uplink synchronization, should not serve as interference to a data channel.

Figure 2:
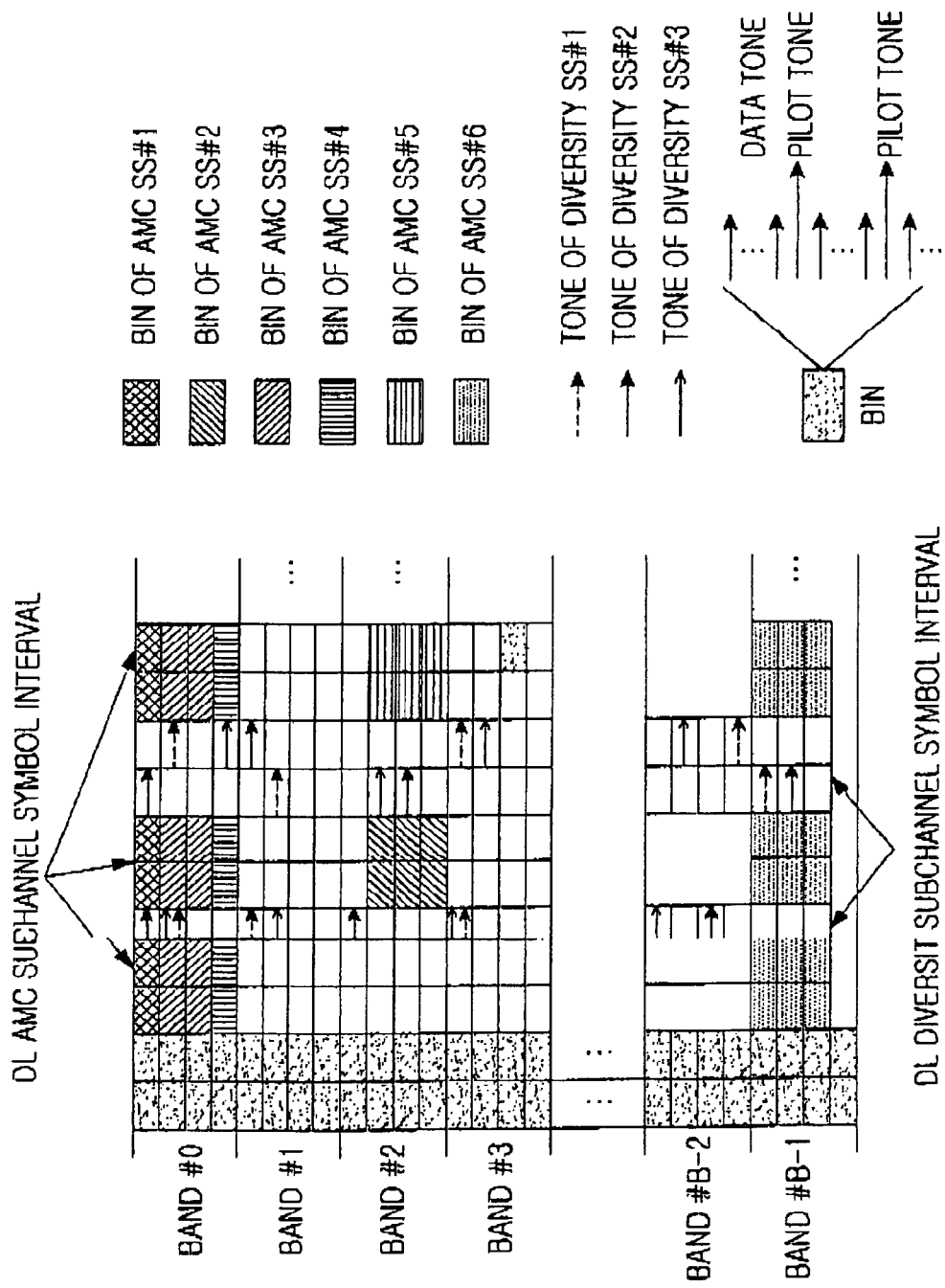
FIG. 2 is a diagram illustrating a detailed structure of the downlink frame illustrated in FIG. 1.

FIG. 2 is a diagram illustrating a detailed structure of the downlink frame illustrated in FIG. 1. However, before a description of FIG. 2 is given, it should be noted that a ratio of downlink AMC subchannels to downlink diversity subchannels can be adaptively determined on a per-OFDM symbol basis. Additionally, in the following description, the OFDM symbol will be referred to as "symbol," for simplicity.

Referring to FIG. 2, the downlink AMC subchannels are formed by grouping a plurality of bins including consecutive tones in the same band. Here, the term "tone" is identical in concept to the subcarrier, and in the following description, it should be noted that the tone has a mixed concept of the tone concept and the subcarrier concept.

The downlink diversity subchannels are formed by dividing all subcarriers in symbol intervals allocated for downlink diversity subchannels into a predetermined number of groups, selecting one subcarrier from each of the groups, and then combining the selected subcarriers. Here, the subcarriers selected from the respective groups to form the downlink diversity subchannels are determined according to a Reed-Solomon (RS) sequence.

For example, if it is assumed that the number of the bands is 24, one subchannel includes 48 tones, each bin includes 8 data tones, and one downlink AMC subchannel includes 6 bins belonging to each band.

In FIG. 2, one downlink AMC subchannel is allocated to an SS#1 and two downlink AMC subchannels are allocated to an SS#3. When 3 symbol intervals are used as diversity intervals for allocating downlink diversity subchannels, 48 groups are formed over the 3 symbols by dividing all subcarriers of the OFDMA cellular communication system into 16 groups in each symbol interval, and a downlink diversity subchannel is formed by selecting one subcarrier from each of the groups. Table 1 below illustrates an example of a parameter structure for an OFDMA cellular communication system using 1024-point Fast Fourier Transform (FFT).

TABLE 1

| No. of bands | No. of bins per band | Bin structure | AMC subchannel | No. of tones per subchannel |
|---|---|---|---|---|
| 24 | 4 | 8 data tones + 1 pilot tone | 6 bins | 48 data tones |

As described above, the downlink diversity subchannels are formed using the RS sequence. That is, a downlink diversity subchannel including 48 data tones is formed by defining a symbol interval in which the downlink diversity subchannel is to be formed, dividing data tones in the defined symbol interval into 48 groups comprised of neighbor data tones, and selecting 1 data tone per group according to the RS sequence. Herein, the number of data tones per group determines a size of Galois Field (GF) in which the RS sequence is defined.

Table 2 below illustrates respective parameters for 1 symbol interval, 2 symbols interval, and 4 symbols interval included in a downlink diversity subchannel. The parameters illustrated in Table 2 are given for a system in which there are 768=48*16 data tones per symbol.

Referring to Table 2, if downlink diversity subchannels are formed in the 1 symbol interval, the number of downlink diversity subchannels including 48 data tones becomes 16, and an increase in the symbol interval, in which the downlink diversity subchannels are defined, increases the number of downlink diversity subchannels and also increases a GF size.

TABLE 2

| Type | 1 Symbol interval | 2 Symbols interval | 4 Symbols interval |
|---|---|---|---|
| No. of groups per symbol | 48 | 24 | 12 |
| GF size | GF(16) | GF(32) | GF(64) |
| No. of subchannels | 16 | 32 | 64 |
| Max No. of collisions per subchannel | 4 (8) | 2 (4) | 1 (2) |
| No. of cell capable to be distinguished | 16 ($16^2$) | 32 ($32^2$) | 64 ($64^2$) |
| No. of tones per group | 16 | 32 | 64 |

As described above, the tone selected from the each group to form the downlink diversity subchannel is determined by the RS sequence, and because each group has Q tones, the tone is selected in such a principle that it is matched to one element of a GF(Q) having Q corresponding elements. That is, if a downlink diversity subchannel sequence is defined in the GF(Q), a basic sequence is defined as $P_o = \{1, \alpha, \alpha^2, \ldots, \alpha^{Q-2}\}$, where $\alpha$ denotes a primitive element of the GF(Q).

Once the basic sequence is defined in this manner, a definition of "for $0 \leq s < Q-1$, $P_s = \alpha^s P_o$ (s times permutation of $P_o$), and for $s = Q-1$, $P_s = \{0, 0, \ldots, 0, 0\}$" can be given for a downlink diversity subchannel #s. Herein, $P_s$ denotes a downlink diversity subchannel sequence used for forming the downlink diversity subchannel #s, and the downlink diversity subchannel is formed by selecting a subcarrier from each group according to the downlink diversity subchannel sequence $P_s$. Because the basic sequence $P_o$ defined in the GF(Q) has a length of (Q−1), if (Q−1) is smaller than 48, the downlink diversity subchannel is formed by generating a sequence with a length longer than 48 by repeating the same sequence, and then cutting the generated long sequence into a sequence with (Q−1)=48. Also, if (Q−1) is larger than 48, the downlink diversity subchannel is formed by cutting the sequence with (Q−1)>48 into a sequence with (Q−1)=48.

Figure 3:
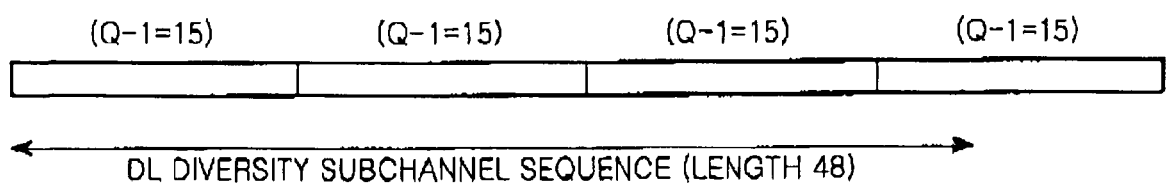
FIG. 3 is a diagram schematically illustrating repetition of an RS sequence used to form a downlink diversity subchannel according to an embodiment of the present invention.

FIG. 3 is a diagram schematically illustrating repetition of an RS sequence used for forming a downlink diversity subchannel according to an embodiment of the present invention. In FIG. 3, an RS sequence with Q=16 is repeated. Therefore, a downlink diversity subchannel sequence used for forming the downlink diversity subchannel is generated by repeating the same RS sequence with a length of 15, four times, and then selecting 48 elements among the elements of the repeated sequence starting from the first element. More specifically, for GF(16), because $P_o = \{1, \alpha, \alpha^2, \ldots, \alpha^{Q-2}\} = \{1, 2, 4, 8, 3, 6, 12, 11, 5, 10, 7, 14, 15, 13, 9\}$ and a length there is 15, a downlink diversity subchannel #0 is formed by generating a downlink diversity subchannel sequence #0 for the downlink diversity subchannel #0 by repeating the $P_o$ four times and selecting 48 elements from the foremost element, and then selecting a subcarrier from each group according to the downlink diversity subchannel sequence #0. Thereafter, the downlink diversity subchannels #1 to #14 are formed by cyclic-shifting the $P_o$ and then repeating the foregoing process.

Finally, a downlink diversity subchannel sequence used for forming a downlink diversity subchannel #15 is defined as a sequence comprised of all 0-elements. Further, in order to make downlink diversity subchannel structures for cells become different, a sequence for a cell #β is defined as $P_{s,\beta} = P_s + \beta_1 \cdot \{\alpha^2, \alpha^4, \alpha^6, \ldots, \alpha^{2(Q-1)}\} + \beta_o \cdot \{1, 1, \ldots, 1, 1\}$; $\beta_1$, $\beta_0 \square$ GF (Q). Here, β denotes a cell identifier (Cell ID), and because Cell ID $\beta = \beta_1 \cdot Q + \beta_0$, a maximum of $Q^2$ cells can be distinguished. In this case, the maximum number of collided subcarriers between different cells' $\{P_{s,\beta}\}$ is 2. If $\beta_1$ is set to 0, the number of Cell IDs becomes Q and the maximum number of subcarriers collided between downlink diversity subchannels of different cells. When the same RS sequence is repeated because of (Q−1)<48, the number of collided subcarriers increases in proportion to the number of repetitions of the same RS sequence.

Figure 4:
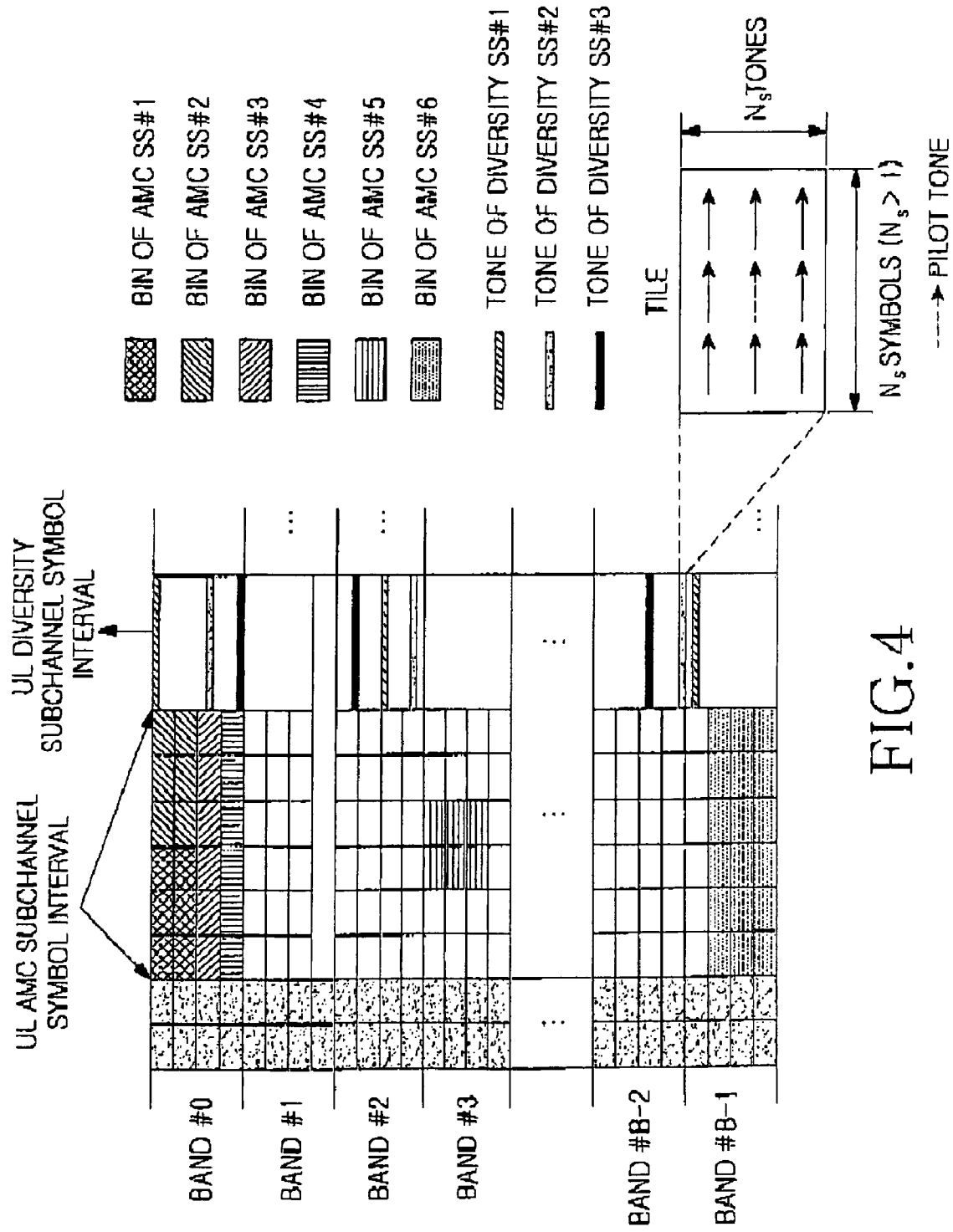
FIG. 4 is a diagram illustrating a detailed structure of the uplink frame illustrated in FIG. 1.

FIG. 4 is a diagram illustrating a detailed structure of the uplink frame illustrated in FIG. 1. As illustrated in FIG. 4, the uplink AMC subchannel is very similar to the downlink AMC subchannel in terms of the structure. However, for the uplink diversity subchannel, tiles neighboring to each other in a time domain and a frequency domain are defined to increase a diversity order in the frequency domain. For example, if it is assumed that a subchannel is comprised of 48 tones and each tile includes 8 data tones, the uplink diversity subchannel includes 6 tiles selected over the entire frequency band. The diversity order depends upon the number of tiles constituting one uplink diversity subchannel.

Further, in order to adaptively control a ratio of uplink AMC subchannels to uplink diversity subchannels, an embodiment of the present invention supports a mode in which the uplink diversity subchannel is formed by selecting the same number of bins from each band. In order to support the foregoing mode, the number of subcarriers in one symbol included in a tile should be set to a divisor of the number of subcarriers constituting a bin. For example, if it is assumed that one bin includes 16 data tones and 2 pilot tones, the number of tones per symbol included in 1 tile can be set to 2, 3, 6, and 9, which are divisors of 18.

In FIG. 4, 9-tone tiles are generated by selecting 3 tones per symbol in 3 symbol intervals, and one subcarrier is selected from each tile and used as a pilot tone. In the OFDMA cellular communication system where 1024-point FFT and 864 tones are used, 288 tiles are formed. Because the uplink can be divided into uplink AMC subchannels and uplink diversity subchannels on a symbol basis, it will be basically assumed that 96/6=16 uplink diversity subchannels are formed with 288/3=96 tiles. Therefore, an uplink diversity subchannel is formed by making six 16-tile groups and selecting 1 tile from each group. Here, an uplink diversity subchannel sequence used for selecting tiles included in the uplink diversity subchannel is generated with first 6 elements of an RS sequence defined in a GF(16).

In addition, the present invention can support various frequency reuse factors in one frame. Herein, the various frequency reuse factors can be supported with the following two schemes.

A first scheme sets the number of bands to a multiple of a frequency reuse factor, and selects the bands in a shape of comb tooth. For example, in the OFDMA cellular communication system in which there are 12 bands and a frequency reuse factor is 3, the first scheme divides band indexes into 3 groups of {0, 3, 6, 9}, {1, 4, 7, 10} and {2, 5, 8, 11}, and enables each cell, i.e., each BS, to use bands existing in different groups.

A second scheme defines the number of bins included in each band to become a multiple of the frequency reuse factor, and selects the bins in a shape of comb tooth. For example, in the OFDMA cellular communication system in which 8 bins included in one band and the frequency reuse factor is 4, the second scheme divides bin indexes into 4 groups of {0, 4}, {1, 5}, {2, 6}, and {3, 7}, and enables each BS to use bands existing in different groups.

A description will now be made of an operation for allocating AMC subchannels and diversity subchannels using the foregoing frame structure.

Figure 5:
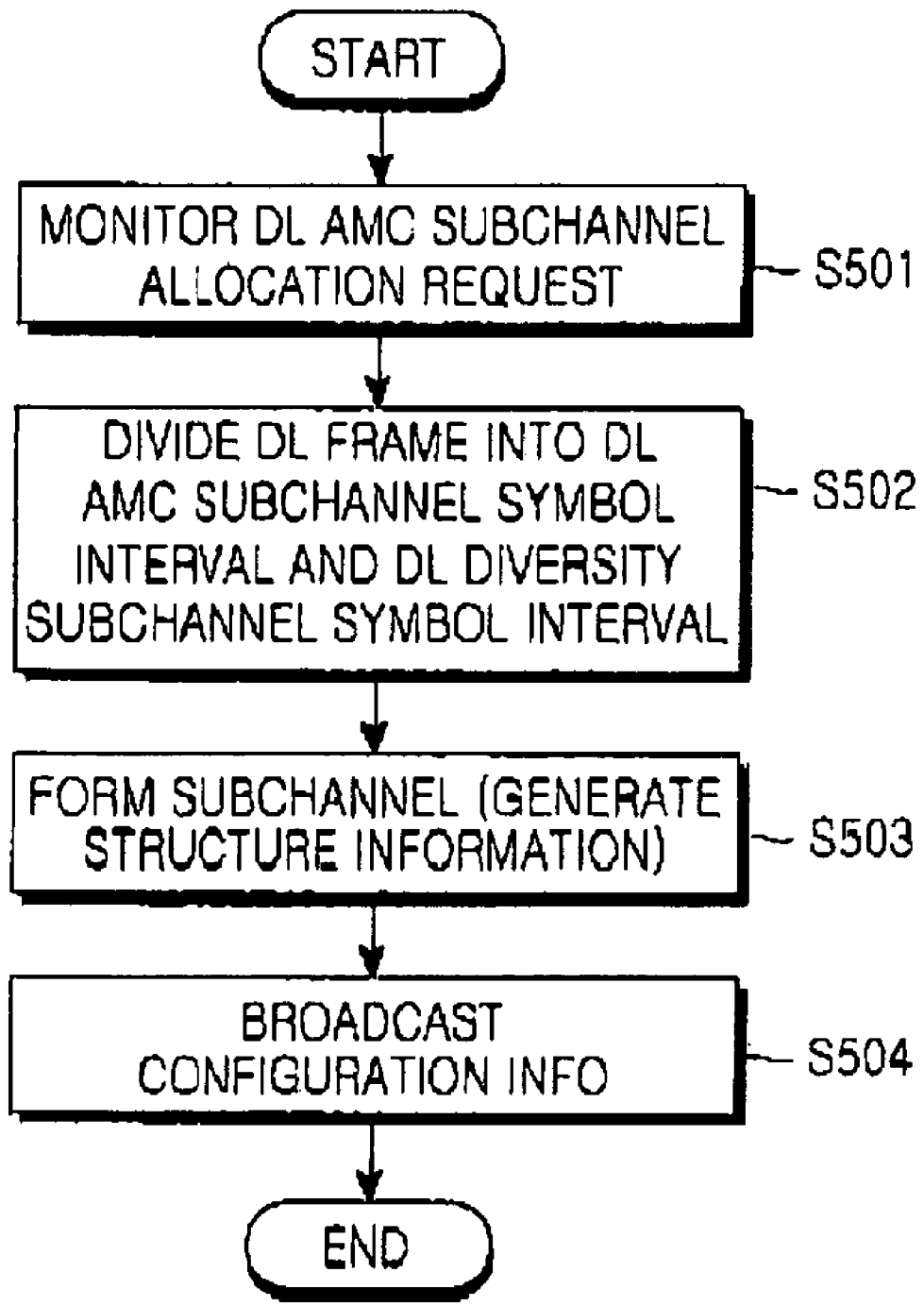
FIG. 5 is a flowchart illustrating a process for forming a downlink AMC subchannel and a downlink diversity subchannel according to an embodiment of the present invention.

FIG. 5 is a flowchart illustrating a process for forming a downlink AMC subchannel and a downlink diversity subchannel according to an embodiment of the present invention. Although a process of forming an AMC subchannel and a diversity subchannel will be described herein with reference to a process for forming a downlink AMC subchannel and a downlink diversity subchannel, a process for forming an uplink AMC subchannel and an uplink diversity subchannel is also similar to the process for forming the downlink AMC subchannel and the downlink diversity subchannel.

Referring to FIG. 5, a BS initially uses the entire frame for downlink diversity subchannels. An SS, monitoring frequency selectivity and time variation of its channel, requests allocation of a downlink AMC subchannel from the BS, if the frequency selectivity is higher than or equal to a predetermined value and the time variation is lower than or equal to a predetermined value. The BS continuously monitors if downlink AMC subchannel allocation requests are received from its SSs in step S501. Based on the monitoring result, the BS determines a size of resources, i.e., symbol intervals, to be allocated to downlink AMC subchannels according to the number of SSs from which the downlink AMC subchannel allocation requests are received.

For example, if the number of SSs requesting allocation of the downlink AMC subchannels is 1/3 of the total number of SSs and one downlink frame has 18 symbols, the BS allocates 6 symbol intervals as downlink AMC subchannel intervals and allocates the other 12 symbol intervals as downlink diversity subchannel intervals in step S502.

Once the downlink diversity symbol intervals are determined in this manner, downlink diversity subchannels are generated in the method described with reference to FIG. 2. For example, when 12 symbol intervals are determined as intervals for generating the downlink diversity subchannels, if consecutive 4 symbols are defined as one slot, 64 downlink diversity subchannels are generated in 1 slot using a GF(64), and 3 such slots are generated. In the process of configuring the OFDMA cellular communication system, such structure information is generated in a table form, and previously defined as a proposed structure #1, a proposed structure #2, . . . , a proposed structure #M in step S503.

If the BS broadcasts a unique number of a selected proposed structure to all of its SSs through a broadcasting channel, the SSs can determine positions of tones allocated thereto for each proposed structure, once only allocation numbers of downlink AMC subchannels and allocation numbers of downlink diversity subchannels are given in step S504.

Figure 6:
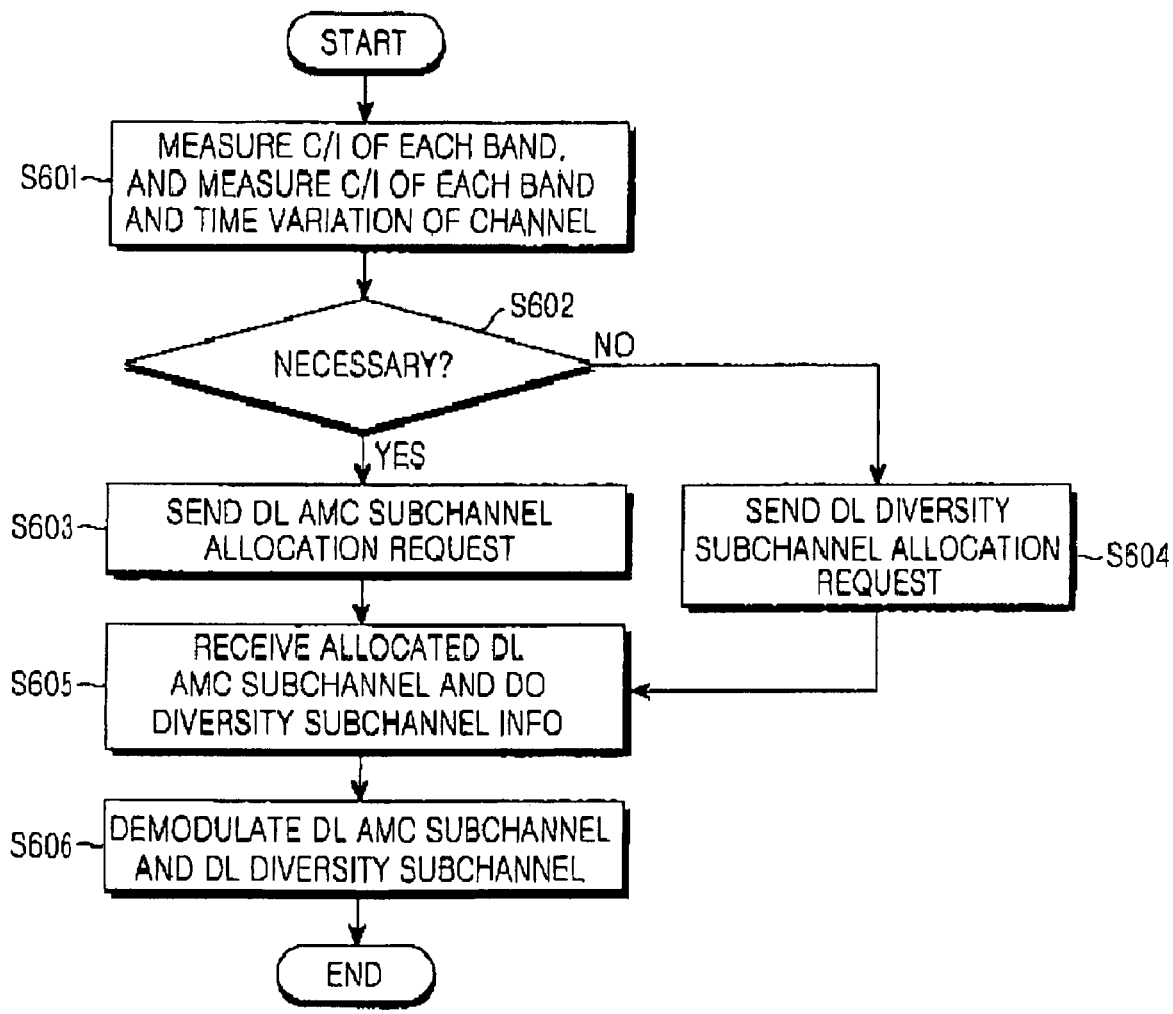
FIG. 6 is a flowchart illustrating a process for allocating a downlink AMC subchannel and a downlink diversity subchannel at a request of an SS according to an embodiment of the present invention.

FIG. 6 is a flowchart illustrating a process for allocating a downlink AMC subchannel and a downlink diversity subchannel at the request of an SS according to an embodiment of the present invention. Although a process for allocating an AMC subchannel and a diversity subchannel will be described herein with reference to a process for allocating a downlink AMC subchannel and a downlink diversity subchannel, a process for allocating an uplink AMC subchannel and an uplink diversity subchannel is also similar to the process for allocating the downlink AMC subchannel and the downlink diversity subchannel.

Referring to FIG. 6, an SS measures a carrier-to-interference ratio (C/I) of each band and time variation of its channel at stated periods in step S601, and determines if it is necessary to request allocation of a downlink AMC subchannel in step S602. Here, the SS determines that it is necessary to request allocation of a downlink AMC subchannel, if a C/I difference between bands is larger than or equal to a predetermined value and a time variation of its channel is less than or equal to a predetermined value.

Although not separately illustrated in FIG. 6, the SS can feed back the C/I of each band to the BS at stated periods or when necessary. Here, the C/I becomes channel quality information (CQI) of the SS.

If it is determined that it is necessary to request allocation of a downlink AMC subchannel, the SS requests the BS for allocation of the downlink AMC subchannel in step S603. However, if it determined that it is not necessary to request allocation of the downlink AMC subchannel, the SS requests the BS for allocation of a downlink diversity subchannel in step S604.

Upon receiving the downlink AMC subchannel allocation request from the SS, the BS determines allocation priorities of downlink AMC subchannels according to the amount and type of data to be transmitted to the SS, and allocates the downlink AMC subchannel requested by the SS. If there is no downlink AMC subchannel and downlink diversity subchannel to be allocated to the SS, the BS allocates subchannels for a mode different from the operation mode requested by the SS, or may fail to allocate a downlink AMC subchannel and a downlink diversity subchannel in a corresponding frame. When the BS transmits information on the allocated downlink AMC subchannel and downlink diversity subchannel to the SS, the SS receives the information on the allocated downlink AMC subchannel and downlink diversity from the BS in step S605.

The SS determines if a downlink AMC subchannel and a downlink diversity subchannel are allocated thereto by analyzing the received downlink AMC subchannel and downlink diversity subchannel allocation information, and restores information data by demodulating corresponding subchannels according to the downlink AMC subchannel and downlink diversity subchannel allocation information in step S606.

As described above, the present invention arranges a preamble interval and a control symbol interval in the head of a downlink frame, such that an SS can rapidly detect initial synchronization and system conditions. In addition, the present invention defines a separate interval for initial access in a downlink frame, thereby preventing a transmission signal of an SS that has failed to acquire synchronization with a BS from serving as interference to a data channel.

Furthermore, the present invention can form both an AMC subchannel and a diversity subchannel in one frame, and can adaptively manage a ratio of radio resources, i.e., symbol intervals, included in AMC subchannels to radio resources included in diversity subchannels in a frame, thereby contributing to efficient resource management. Moreover, the present invention can form AMC subchannels and diversity subchannels such that various frequency reuse factors are supported in the same frame.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for allocating a subchannel by a transmitter in an Orthogonal Frequency Division Multiple Access (OFDMA) communication system in which an entire frequency band includes a plurality of bands, each of the plurality of bands includes a plurality of bins, and each of the plurality of bins includes a plurality of subcarriers, the method comprising:

selecting, by the transmitter, any one of the plurality of bands in an Adaptive Modulation and Coding (AMC) subchannel time interval;

selecting, by the transmitter, a predetermined number of bins among the plurality of bins in the selected band; and allocating, by the transmitter, the selected bins as an AMC subchannel, wherein a predetermined time interval is divided into the AMC subchannel time interval and a diversity subchannel time interval.

2. The method of claim 1, wherein the predetermined time interval is divided into the AMC subchannel time interval and the diversity subchannel time interval according to a ratio of the AMC subchannel time interval to the diversity subchannel time interval, and the ratio is determined
according to a number of receivers requesting allocation of the AMC subchannels.

3. The method of claim 1, wherein selecting the any one of the plurality of bands in the AMC subchannel time interval comprises selecting the any one of the plurality of bands according to channel quality information fed back from a receiver.

4. The method of claim 1, wherein a unit time interval of each of the AMC subchannel time interval and the diversity subchannel time interval is a symbol time interval.

5. The method of claim 1, further comprising:

selecting any one of subcarriers in each of a plurality of groups; and allocating the selected subcarrier as the diversity subchannel, wherein the entire frequency band is divided into the plurality of groups in the diversity subchannel time interval.

6. The method of claim 5, wherein selecting the any one of the subcarriers in each of the plurality of groups comprises selecting the any one of subcarriers in each of the plurality of groups according to a diversity subchannel sequence.

7. The method of claim 1, wherein subcarriers included in each of the plurality of bins are neighbor subcarriers.

8. The method of claim 1, wherein the predetermined number of bins allocated as the AMC subchannel are one of neighbor bins and spaced-apart bins.

9. A method for allocating a subchannel by a transmitter in an Orthogonal Frequency Division Multiple Access (OFDMA) communication system in which an entire frequency band includes a plurality of bands, each of the plurality of bands includes a plurality of bins, and each of the plurality of bins includes a plurality of subcarriers, the method comprising:

allocating, by the transmitter, an Adaptive Modulation and Coding (AMC) subchannel in an AMC subchannel time interval; and allocating, by the transmitter, a diversity subchannel in a diversity subchannel time interval, wherein a predetermined time interval is divided into the AMC subchannel time interval and the diversity subchannel time interval, and wherein allocating the diversity subchannel comprises:

selecting any one of the subcarriers in each of a plurality of groups; and allocating the selected subcarrier as the diversity subchannel, wherein the frequency band is divided into the plurality of groups in the diversity subchannel time interval.

10. The method of claim 9, wherein selecting the any one of subcarriers in each of the plurality of groups comprises selecting the any one of subcarriers in each of the plurality of groups according to a diversity subchannel sequence.

11. The method of claim 9, wherein the predetermined time interval is divided into the AMC subchannel time interval and the diversity subchannel time interval according to a ratio of the AMC subchannel time interval to the diversity subchannel time interval, and the ratio is determined
according to a number of receivers requesting allocation of the AMC subchannels.

12. The method of claim 9, wherein a unit time interval of each of the AMC subchannel time interval and the diversity subchannel time interval is a symbol time interval.

13. The method of claim 9, wherein subcarriers included in each of the plurality of bins are neighbor subcarriers.

* * * * *

UNITED STATES PATENT AND TRADEMARK OFFICE
CERTIFICATE OF CORRECTION

PATENT NO. : 7,668,253 B2  Page 1 of 1
APPLICATION NO. : 11/074040
DATED : February 23, 2010
INVENTOR(S) : Hwang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1229 days.

Signed and Sealed this

Seventh Day of December, 2010

David J. Kappos
*Director of the United States Patent and Trademark Office*